(12) United States Patent
Kim et al.

(10) Patent No.: US 7,076,776 B2
(45) Date of Patent: Jul. 11, 2006

(54) PARALLEL LOOP TRANSFORMATION METHODS FOR RACE DETECTION DURING AN EXECUTION OF PARALLEL PROGRAMS

(75) Inventors: Jeong Si Kim, Taejon (KR); Dong Soo Han, Taejon (KR); Chan Su Yu, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 523 days.

(21) Appl. No.: 10/025,556

(22) Filed: Dec. 26, 2001

(65) Prior Publication Data

US 2003/0097653 A1  May 22, 2003

(30) Foreign Application Priority Data

Nov. 22, 2001  (KR)  ............................... 2001-73052

(51) Int. Cl.
*G06F 9/44* (2006.01)
*G06F 9/45* (2006.01)
(52) U.S. Cl. ..................... 717/160; 717/130; 717/119
(58) Field of Classification Search ........ 717/100–178; 718/100
See application file for complete search history.

(56) References Cited

U.S. PATENT DOCUMENTS

| | | | | |
|---|---|---|---|---|
| 5,151,991 A | * | 9/1992 | Iwasawa et al. | ............. 717/150 |
| 5,832,272 A | * | 11/1998 | Kalantery | .................... 717/149 |
| 5,842,022 A | * | 11/1998 | Nakahira et al. | ........... 717/160 |
| 6,286,130 B1 | * | 9/2001 | Poulsen et al. | ............. 717/119 |
| 6,343,371 B1 | * | 1/2002 | Flanagan et al. | ........... 717/124 |
| 6,374,403 B1 | * | 4/2002 | Darte et al. | ................. 717/161 |
| 6,438,747 B1 | * | 8/2002 | Schreiber et al. | ........... 717/160 |
| 6,817,009 B1 | * | 11/2004 | Flanagan et al. | ........... 717/126 |
| 6,826,752 B1 | * | 11/2004 | Thornley et al. | ........... 718/100 |
| 2001/0047511 A1 | * | 11/2001 | Itou et al. | .................... 717/149 |

OTHER PUBLICATIONS

Kim et la., "Scalable On-the-fly Detection of the First Races in Parallel Programs," ACM, 1998.*
Hood et al., "Parallel Program Debugging with On-the-fly Anomaly Detection," IEEE, 1990.*
Gupto et al., "Loop Monotonic Computations: An Approach for the Efficient Run-time Detection of Races," ACM, 1991.*
Rauchwerger et al., "The LRPD Test: Speculative Run-Time Parallelization of Loops with Privatization and Reduction Paralleization," ACM, 1995.*

(Continued)

*Primary Examiner*—Kakali Chaki
*Assistant Examiner*—Insun Kang
(74) *Attorney, Agent, or Firm*—Mayer, Brown, Rowe & Maw LLP

(57) ABSTRACT

A parallel loop transformation method for race detection during an execution of parallel programs that includes generating a data structure of a condition statement branch determinant string Cstr required for loop transformation by taking an original parallel loop as an input and extracting execution path information, transforming the original parallel loop into a full race covering loop using the data structure of the condition statement branch determinant string Cstr required for loop transformation and the execution path information as an input statement, instrumenting the race detection function in order to activate the race detection function for the transformed parallel loop which are previously generated, and executing the race detection while running the parallel programs according to instrumented detection functions.

18 Claims, 5 Drawing Sheets

OTHER PUBLICATIONS

Choi et al., Race Frontier: Reproducing Data Races in Parallel-Program Debugging, ACM, 1991.*

Balasundaram et al., Compile-time Detection of Race Conditions in a Parallel Program, 1986.*

Gupta, "Loop Displacement: An Approach for Transforming and Scheduling Loops for Paralel Execution," IEEE, 1990.*

Jun et al., On-the-fly Detection of Access Anomalies in nested parallel Loops, ACM, 1993.*

Park et al., "Two-pass On-the-fly Detection of the First Races in Shared-Memory parallel programs," ACM, 1998.*

Kim, et al.; Parallel Loop Transformation.; Eighth International Conference on Parallel and Distributed Systems, ICPADS 2001 Jun. 2001, p. 265-272.

* cited by examiner

CSTR (CONDITION STATEMENT BRANCH DETERMINANT STRING) CONSTRUCTION OF DATA STRUTURE

THE CONSTRUCTION OF EXECUTION PATH CONTROL STATEMENT

```
P=(I/stride) mod k ;
if (p .eq.0)
    Cstr= (0)₂;
else if (p .eq.1)
    Cstr=(1)₂;
        ⋮
        else if (p .eq.k-1)
            Cstr=(k-1)₂;
endif
,where I is loop control variable
and k is the number of paths in a loop
```

PARALLEL LOOP TRANSFORMATION METHODS FOR RACE DETECTION DURING AN EXECUTION OF PARALLEL PROGRAMS

BACKGROUND OF THE INVENTION

The present invention relates to parallel loop transformation methods for race detection during an execution of parallel programs. More particularly, the invention relates to a race detection method which is one of the debugging methods for parallel loop programs. The development of parallel programs for shared memory multiprocessors has a number of difficult problems in comparison to the development of serial programs. The main difficulty stems from the complexity of program construction and the conspicuous absence of debugging methods for the parallel errors inherent in a parallel program. The race detection according to the present invention is a debugging method for these races among the parallel errors. Since the races result in an unintended non-deterministic execution of the programs in which the repeatability of an execution is not guaranteed, they are regarded as one of the most difficult parallel errors that prevents even the application of a cyclic debugging method based on breakpoint. A number of methods have been developed for detecting the races for the purpose of debugging. Among these, the race detection method during an execution of parallel programs is capable of detecting as well as reporting the occurrence of the races during an execution of a program which is subjected to a debugging process. In view of the delicate characteristics of the races at a point of execution, this race detection method is valued as the most effective. The present methods available for detecting races during the execution of a parallel program simultaneously perform the processing and monitoring functions necessary for detecting races through a software monitoring device which monitors the whole execution of the program. However, due to the characteristics of a parallel program which require a long running time as a result of massive parallelism and the dramatic inflation of execution time induced by software monitoring, a practical implementation of the present race detection methods during an execution is not simple. Especially, the most commonly used parallel construction in shared memory parallel programs is a parallel loop and it consumes the largest portion of the total program execution time. This is the area in which most of the research efforts for improving the efficiency of the race detection methods during an execution are being concentrated.

Hereinafter, the race detection methods for parallel loops according to prior art will be described in detail with reference to FIG. 1.

FIG. 1 is a work flow chart of the race detection methods for parallel loops according to prior art.

First of all, prior to an execution of a parallel program, the race detection function is instrumented (S101) in order for all iterations corresponding to each parallel loop to perform inspection and monitoring processes for the race detection at a point of execution.

Afterwards, the program is executed for the race detection (S102). In general, the race detection method according to prior art for a standard parallel loop where several thousands or significantly more iterations are performed, the performance deterioration due to a long running time is unavoidable.

SUMMARY OF THE INVENTION

The object of the present invention is to provide a parallel loop transformation method for race detection during an execution of parallel programs which can minimize the number of subjects to be monitored during the execution of parallel programs for an effective race detection.

DETAILED DESCRIPTION OF THE EMBODIMENTS

Figure 1:
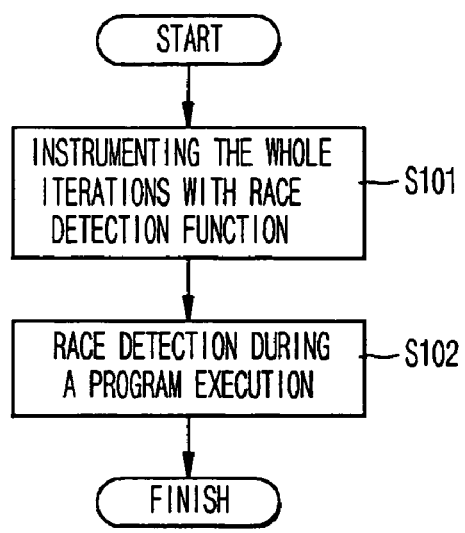
FIG. 1 is a work flow chart of the race detection methods for parallel loops according to prior art.

The parallel loop transformation method for race detection during an execution of parallel programs according to the present invention requires only two monitoring operations on the identical execution path for race detection irrespective of the maximum parallelism while the conventional methods perform a lot of duplicate and redundant monitoring operations since the entire loop is monitored on each loop even though the body of the each loop includes only a few execution paths. The objective of the present invention is achieved by minimizing the unnecessary monitoring time required for such a duplicate monitoring.

Hence, the present invention transforms the original parallel loop into a parallel loop which should be monitored for detecting race and which can be dynamically recognized.

In order to obtain the necessary information for the above transformation, a static analysis method for parallel loops as well as the method for actively utilizing race detection devices for monitoring only the iterations which are subjected to monitoring on parallel loops should be used in a row.

The parallel loop transformation method for race detection during an execution of parallel programs according to the present invention, in which the original parallel loop is transformed into a full race covering loop for the race detection during the program execution subjected to parallel loop programs, comprises; a static analysis step of generating the data structure of a condition statement branch determinant string Cstr required for loop transformation taking the parallel loop as an input and extracting the execution path information; a parallel loop transformation step of transforming the parallel loop into a full race covering loop using said data structure of a condition statement branch determinant string Cstr required for the loop transformation and said execution paths information; a race detection function instrumentation step of instrumenting the race detection function in order to activate race detection function for the transformed parallel loop which are generated at said parallel loop transformation step; and a race detection execution step of executing race detection while running the parallel program according to instrumented detection functions which are determined at said race detection function instrumentation step.

The static analysis step further comprises; an input step of sequentially receiving each statement of each parallel loop body in order to generate a single Cstr data structure for each single parallel loop; an assignment step of assigning a bit variable which can store a true or false value to corresponding if-statement if said input statement is an if-statement; and an extraction step of extracting the Cstr data structure and the number of execution path for each parallel loop through an arbitrary path analyzer after assigning said bit variable.

Also, the parallel loop transformation step further comprises; a determination step of determining whether the input statement is the first statement or not after a new statement is inputted to the loop body; an insertion step of inserting an execution path control statement, prior to the input statement if the inputted statement is determined to be the first statement, which dynamically assigns an appropriate value for Cstr in order to allow each iteration to have an intended execution path so as to minimize the duplicate monitoring for race detection against the parallel loop; a substitution step of substituting the conditional equation C1 by a conditional statement for $(Cstr[c\_con\_bit].eq.\ 1) \wedge ((\neg C1) \vee (C1))$ if the present statement is determined to be a conditional statement after the execution path control statement is inserted; and a repeating step of repeating the above actions until the inputted statement is determined to be the last statement. Here, if the present statement is not an if-statement, the input statement is maintained as it is and the above processes are repeated until a parallel loops is transformed into full race covering loop.

The above execution path control statement determines the value of Cstr which is to be used for determining the execution path of the loop body from the present iteration using the value of the present loop control variable of each iteration.

The above substituted conditional statement determines the branching of the present conditional statement using the Cstr value corresponding to the present conditional equation while maintaining the semantic of the original conditional equation.

The race detection function instrumentation step further comprises; a determination step of determining whether the statement inputted to embed an appropriate race detection function into the transformed parallel loop is the beginning and ending statements of the parallel loop; an insertion step of a label creation statement and end statement which function on the iteration less than two times of the front and end execution paths until the last statement is inputted if the inputted statement is determined to be either the beginning and ending statements of the parallel loop; an inspection step of inspecting whether the present statement includes an accessing incident of the shared variables or not, if the inputted statement is not the beginning and ending statements of the parallel loop; and a instrumentation step of instrumenting the inspection statement, which inspects whether or not the accessing incident participates in the race, functions on the iteration less than two times of the execution paths until the last statement if the present statement includes an accessing incident of the shared variables.

The parallel loop transformation method for race detection during an execution of parallel programs according to the present invention implements all the executable instructions of a digital processing apparatus according to their types.

The read/write process of the digital processing apparatus comprises a static analysis step of generating the data structure of a condition statement branch determinant string Cstr required for loop transformation taking the parallel loop as an input and extracting the execution path information; a parallel loop transformation step of transforming the parallel loop into a full race covering loop using said data structure of a condition statement branch determinant string Cstr required for loop transformation and said execution paths information; a race detection function instrumentation step of instrumenting the race detection function in order to activate race detection within the iteration instances necessary for the transformed parallel loop which are generated at said parallel loop transformation step; and a race detection execution step of executing race detection while running the parallel program according to instrumented detection functions which are determined at said race detection function instrumentation step.

Hereinafter, preferred embodiments of the present invention will be described in detail with reference to the accompanying drawings.

Figure 2:
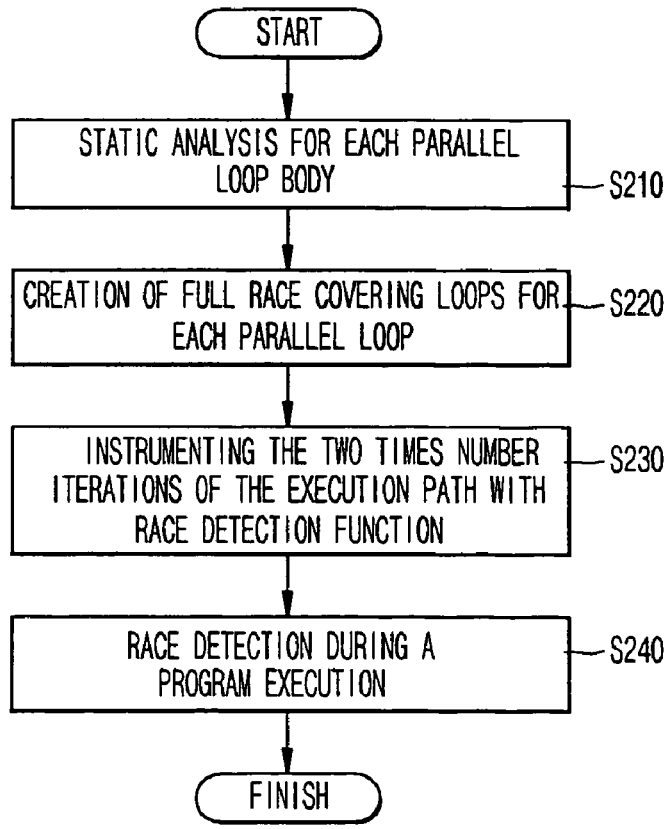
FIG. 2 is a work flow chart of the race detection methods for parallel loops according to the present invention.

FIG. 2 is a work flow chart of the race detection methods for parallel loops according to the present invention.

First of all, the necessary information for a parallel loop transformation is extracted from a static analysis of the loop body due to the input from each parallel loop (S210). After the necessary information for a parallel loop transformation is extracted, transformed parallel loops are created by receiving the extracted information and parallel loops. At this instance, each statement in the parallel loop instruments the race detection function after creating a full race covering loop. To be more specific, the transformed parallel loop instruments the necessary race detection functions (S230) in order to allow the monitoring of races through real executions. However, this step is commonly used for the standard parallel loop transformation method for race detection during an execution of parallel programs. The present invention adds a method which maximizes the instrumented race detection function on the iteration less than two times of the execution paths. As shown so far, if the race detection function on the iteration less than two times of the execution paths is instrumented, the instrumented race detection function executes the transformed parallel loop in order to detect races (S240). Here, the S210 step concerning the static analysis step for each parallel loop body will be described in detail with reference to FIG. 3.

Figure 3:
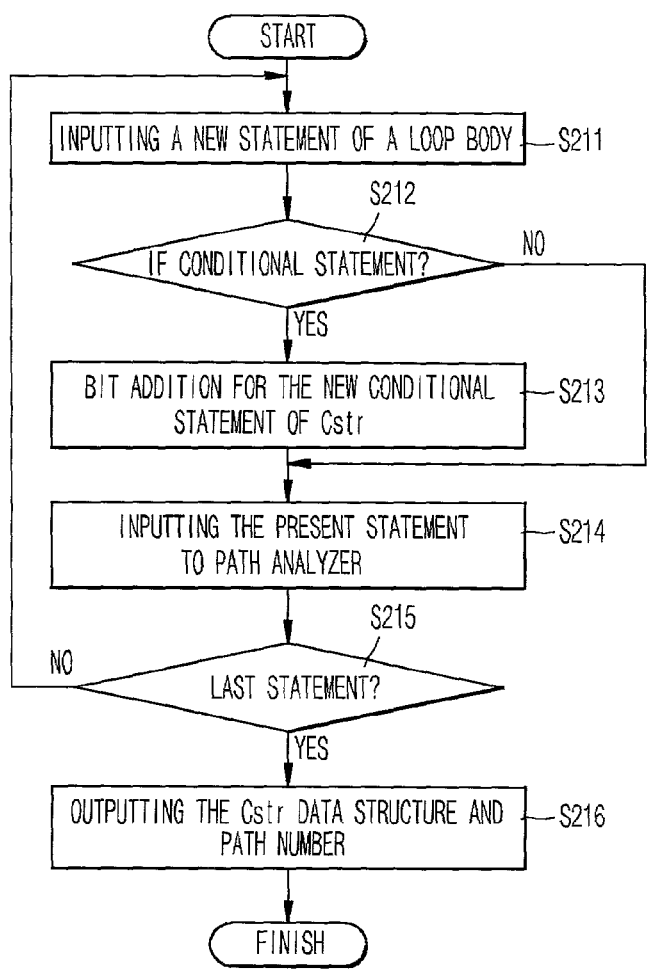
FIG. 3 is a detailed work flow diagram of the S210 step (static analysis step) as described in FIG. 2.

FIG. 3 is a detailed work flow diagram of the S210 step (static analysis step) as described in FIG. 2.

First of all, by inputting each statement included in the parallel loops, the presently analyzed statement is determined whether it is an if-statement or not. After the above determination, if the presently analyzed statement is an if-statement, then a space is allocated for the data structure of the condition statement branch determinant string Cstr (S213). In this case, the Cstr controls the value of conditional equation of the if-statements which determines the execution paths within the parallel loop body in order to represent the iterations within the parallel loop iterations which have execution paths that are required to be monitored as predictable patterns. More specifically, a bit is being added to Cstr for new conditional statements.

Figure 4:
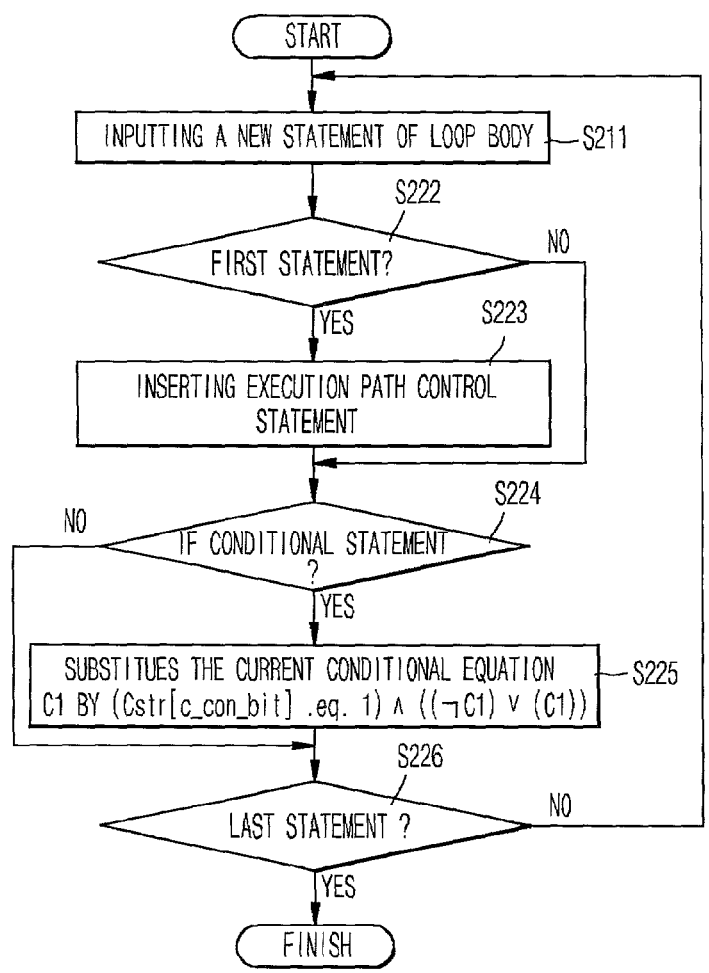
FIG. 4 is a detailed work flow diagram of the S220 step (loop creation step) as described in FIG. 2.
Figure 5:
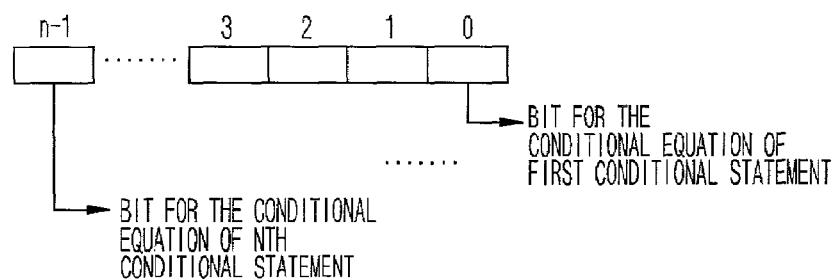
FIG. 5 is a diagram which shows examples of a configuration diagram of the data structure of a condition statement branch determinant string and execution path control statement used for the work flow of FIG. 2.

A detailed structure of the Cstr can be referenced from FIG. 5. FIG. 5 is a diagram which shows examples of a configuration diagram and execution path control statement of the data structure of a condition statement branch determinant string used for the work flow of FIG. 3 and FIG. 4. From FIG. 5, the Cstr available in each parallel loop has a bit within each conditional statement in order to represent a true or false value of the conditional statement. The number of execution paths of the loop body of the statements which have undergone the above processes are used for an analysis step by feeding them into an execution analyzer (S214). During the S212 step, if the presently analyzed statement is not an if-statement, it is inputted to the path analyzer at once.

Afterwards, the presently analyzed statement is determined whether it is the last statement or not, if it is not, then the path is examined through the identical method as shown previously. If it is a indeed the last statement, then the Cstr information and the number of execution path are outputted (S216). More specifically, the path analysis is continued until the last statement of the parallel loop is received and finally, the necessary information for parallel loop transformation is extracted by outputting the Cstr information and the number of execution path.

Here, the S220 step concerning the creation of a fill race covering loop of each parallel will be described in detail with reference to FIG. 4.

FIG. 4 is a detailed work flow diagram of the S220 step (loop creation step) as described in FIG. 2.

As shown in FIG. 3, once the static analysis of each loop body is completed, each statement of the parallel loop body is inputted (S221) and the inputted statement is determined whether or not it is the first statement. If the input statement is indeed the first statement, then an execution path control statement inserted prior to the input statement.

The execution path control statement dynamically allocates an appropriate Cstr value on each allocation in order for each iteration to have an intended execution path consequently minimizing the duplicate race detection monitoring for the parallel loops. The basic form of an execution path control statement is as shown in FIG. 5

Using the present loop control variable value of each iteration, the Cstr value for determining the loop body execution path of the present iteration is obtained.

This process is only required when the present statement is the first statement. After going through the S223 step, the present statement is determined whether there exists an if conditional statement (S224). If the presently inputted statement is not the first statement in S222 step, the step progresses straight to S224 without going through the 223 step. If the present statement is an if-statement in the step 224, then the conditional equation C1 of the conditional statement is substituted (S225) by a conditional statement for (Cstr[c_con_bit].eq. 1) $\wedge$ (($\vdash$C1) $\vee$ (C1)). The above substituted conditional statement determines the branching of the present conditional statement using the Cstr value corresponding to the present conditional equation while maintaining the circular conditional equation semantic. Then, the presently inputted statement is determined whether or not it is the last statement (S226), if the presently inputted statement is not the last statement, then the identical process is continued until the last statement is received. Afterwards, the arbitrary parallel loop is transformed into a full race covering loop.

If the present statement is an if-statement in the step 224, then the present statement is maintained as it is and the above process is continued until the last statement is received in order to transform the arbitrary parallel loop in a full race covering loop.

Here, the step concerning the instrumentation of race detection function as described in FIG. 2 will be described in detail with reference to FIG. 6.

Figure 6:
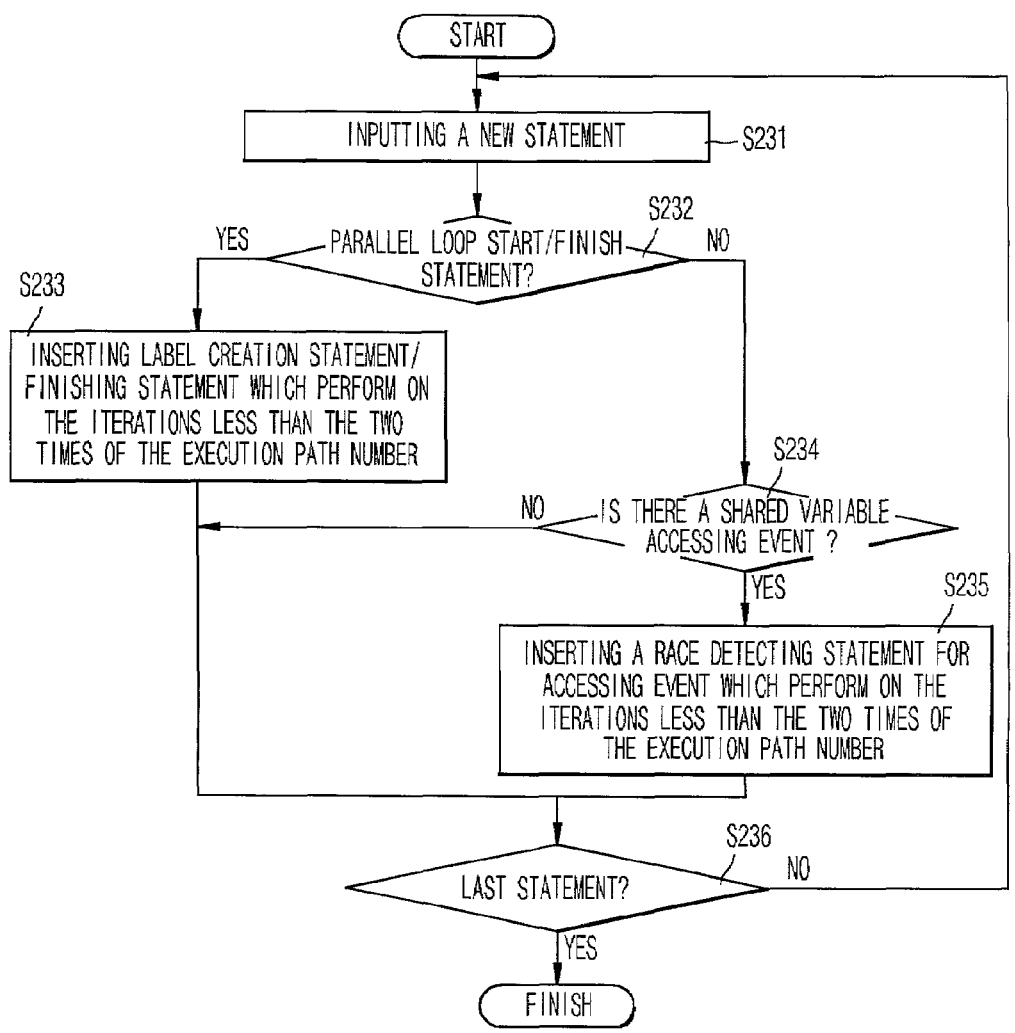
FIG. 6 is a detailed work flow diagram of the S230 step race detection function instrumentation step as described in FIG. 2.

FIG. 6 is a detailed work flow diagram of the S230 step (race detection function instrumentation step) as described in FIG. 2.

First of all, this process can operate in parallel with the full race covering loop step as described in FIG. 4. The process allows to maximize the race detection only for the iterations to be monitored in the transformed parallel loop.

The race detection function instrumentation step as described in FIG. 6, when each of the statements of the parallel loop are inputted (S231) the presently inputted statement is determined whether it is the beginning and ending statement of the parallel loop (S232).

After the above determination, if the presently inputted statement is the beginning and ending statement of the parallel loop, then each of the label creation statements and ending statements which function on the iteration less than two times of the front and end execution paths are instrumented and inserted (S233).

The instrumentation for the types of the label creation statements and ending statements are beyond the scope of the present invention. The corresponding conventional methods can be utilized.

If the new input statement in the S232 step is neither the beginning nor the ending of a parallel loop, the shared variables of the present statement are inspected to see whether any accessing incident is included (S234). After the above inspection, if the shared variables of the present statement include accessing incidents, then the statement which inspects the inclusion of these accessing incidents is allowed to function on the iteration less than two times of the execution paths (S235). Afterwards, the present statement is determined whether or not it is the last statement (S236), if the present statement is indeed the last statement, the race detection instrumentation process is terminated. On the contrary, if the present statement is not the last statement, the race detection instrumentation process is executed according to the methods as shown above.

As shown so far, the present invention provides a race detection method during an execution of parallel programs which is one of the debugging methods for parallel loop programs. Using the information obtained from a static analysis of parallel loop bodies, the monitoring time for race detection is improved by transforming the loop bodies in order for only the necessary iterations for race detection can be dynamically instrumented during the execution.

Specifically, in comparison to the conventional monitoring methods which typically consumes a long time since they monitor the full iterations for each parallel loop in parallel loop programs, by monitoring two times of the execution paths irrespective of the parallelism of each parallel loop, the present invention can significantly reduce the execution time. As a result, the present invention allows a convenient race detection of parallel loop programs therefore improving the effectiveness of race detection.

What is claimed is:

1. A parallel loop transformation method for race detection during an execution of parallel programs, the method comprising:
   (a) generating a data structure of a condition statement branch determinant string Cstr required for loop transformation by taking an original parallel loop as an input and extracting execution path information;
   (b) transforming the original parallel loop into a full race covering loop using said data structure of the condition statement branch determinant string Cstr required for loop transformation and said execution paths information as an input statement;
(c) instrumenting a race detection function in order to activate the race detection function for the transformed parallel loop which are generated at said step (b); and
(d) executing the race detection while running the parallel programs according to the instrumented race detection functions which are determined at said step (c).

2. The method as claimed in claim 1, wherein said step (a) further comprises the steps of:
(a-1) sequentially receiving each statement of each parallel loop body in order to generate a single Cstr data structure for each single parallel loop;
(a-2) assigning a bit variable which can store a true or false value to corresponding if-statement if said input statement is an if-statement; and
(a-3) extracting the Cstr data structure and the number of execution path for each parallel loop through an arbitrary path analyzer after assigning said bit variable.

3. The method as claimed in claim 1, wherein said step (b) further comprises the steps of:
(b-1) determining whether the input statement is the first statement or not after a new statement is inputted to the loop body;
(b-2) inserting an execution path control statement, prior to the input statement if the inputted statement is determined to be the first statement, which dynamically assigns an appropriate value for Cstr in order to allow each iteration to have an intended execution path so as to minimize the duplicate monitoring for race detection against the original parallel loop;
(b-3) substituting the conditional equation C1 of a conditional statement by a conditional statement for (Cstr[C_con_bit].eq. 1) $\wedge$ ((⌐C1) $\vee$ (C1))if the present statement
(b-4) repeating the above actions until the inputted statement is determined to be the last statement where, if the present statement is not an if-statement, the input statement is maintained as it is and the above processes are repeated until a parallel loop is transformed into full race covering loop.

4. The method as claimed in claim 3, wherein said present statement is not an if-statement, the input statement is maintained as it is and the above processes are repeated until the original parallel loop is transformed into the full race covering loop.

5. The method as claimed in claim 3, wherein said execution path control statement can be listed as;
p=(l/stride) mod k;
if(p .eq. 0)
   Cstr=(0)2
Else if (p .eq. 1)
   Cstr=(1)2;
Else if(p .eq. K−1)
Cstr=(K−1)2;
Endif,
where l is loop control variable and k is the number of paths.

6. The method as claimed in claim 3, wherein said execution path control statement determines the value of Cstr which is to be used for determining the execution path of the loop body from the present iteration using the value of the present loop control variable of each iteration.

7. The method as claimed in claim 3, wherein said substituted conditional statement determines the branching of the present conditional statement using the Cstr value corresponding to the present conditional equation while maintaining the semantic of the original conditional equation.

8. The method as claimed in claim 1, wherein said step (c) further comprises the steps of:
(c-1) determining whether the statement inputted to instrument an appropriate race detection function for the transformed parallel loop is the beginning and ending statement of the parallel loop;
(c-2) instrumenting a label creation statement and a end statement which function on the iteration less than two times of the front and end execution paths until the last statement is inputted if the inputted statement is determined to be either the beginning and ending statement of the parallel loop;
(c-4) instrumenting the inspection statement, which inspects whether or not the accessing incident participates in the race, functions on the iteration less than two times of the execution paths until the last statement if the present statement includes an accessing incident of the shared variables.

9. The method as claimed in claim 8, where said step (c) further comprises the steps of:
(c-5) inspecting the shared variables of said present statement to see whether any accessing incident is included if said input statement is neither the beginning nor the ending of a parallel loop; and
(c-6) instrumenting the statement which inspects the inclusion of these accessing incidents to function on the iteration less than two times of the execution paths if the shared variables of the present statement include accessing incidents.

10. A recording medium which implements all the executable instructions of a digital processing apparatus according to their types and can be written/read from said digital processing apparatus, the recording medium having thereon computer executable instructions comprising the steps of:
(a) generating a data structure of a condition statement branch determinant string Cstr required for loop transformation by taking an original parallel loop as an input and extracting execution path information;
(b) transforming the original parallel loop into a full race covering loop using said data structure of the condition statement branch determinant string Cstr required for loop transformation and said execution paths information as an input statement;
(c) instrumenting a race detection function in order to activate the race detection within the iteration instances necessary for the transformed parallel loop which are generated at said step (b); and
(d) executing the race detection while running the parallel programs according to the instrumented race detection functions which are determined at said step (c).

11. The recording medium as claimed in claim 10, wherein said step (a) further comprises the steps of:
(a-1) sequentially receiving each statement of each parallel loop body in order to generate a single Cstr data structure for each single parallel loop;
(a-2) assigning a bit variable which can store a true or false value to corresponding if-statement if said input statement is an if-statement; and
(a-3) extracting the Cstr data structure and the number of execution path for each parallel loop through an arbitrary path analyzer after assigning said bit variable.

12. The recording medium as claimed in claim 10, wherein said step (b) further comprises the steps of:

(b-1) determining whether the input statement is the first statement or not after a new statement is inputted to the loop body;

(b-2) inserting an execution path control statement, prior to the input statement if the inputted statement is determined to be the first statement, which dynamically assigns an appropriate value for Cstr in order to allow each iteration to have an intended execution path so as to minimize the duplicate monitoring for race detection against the original parallel loop;

(b-3) substituting the conditional equation C1 of a conditional statement by a conditional statement for (Cstr [c_con$_{13}$ bit].eq.1) ∧ ((⌐C1) ∨ (C1)) if the present statement is determined to be a conditional statement after the execution path control statement is inserted; and (b-4) repeating the above actions until the inputted statement is determined to be the last statement where, if the present statement is not an if-statement, the input statement is maintained as it is and the above processes are repeated until a parallel loop is transformed into full race covering loop.

13. The recording medium as claimed in claim 12, wherein said present statement is not an if-statement, the input statement is maintained as it is and the above processes are repeated until the original parallel loop is transformed into the full race covering loop.

14. The recording medium as claimed in claim 12, wherein said execution path control statement can be listed as;

p(l/stride) mod k;
if(p .eq. 0)
    Cstr=(0)2
Else if (p .eq. 1)
    Cstr=(1)2;
Else if (p .eq. K−1)
Cstr=(K−1)2;
Endif,
where l is loop control variable and k is the number of paths.

15. The recording medium as claimed in claim 12, wherein said execution path control statement determines the value of Cstr which is to be used for determining the execution path of the loop body from the present iteration using the value of the present loop control variable of each iteration.

16. The recording medium as claimed in claim 12, wherein said substituted conditional statement determines the branching of the present conditional statement using the Cstr value corresponding to the present conditional equation while maintaining the semantic of the original conditional equation.

17. The recording medium as claimed in claim 10, wherein said step (c) further comprises the steps of:

(c-1) determining whether the statement inputted to instrument an appropriate race detection function for the transformed parallel loop is the beginning and ending statement of the parallel loop;

(c-2) instrumenting a label creation statement and a end statement which function on the iteration less than two times of the front and end execution paths until the last statement is inputted if the inputted statement is determined to be either the beginning and ending statement of the parallel loop;

(c-4) instrumenting the inspection statement, which inspects whether or not the accessing incident participates in the race, functions on the iteration less than two times of the execution paths until the last statement if the present statement includes an accessing incident of the shared variables.

18. The recording medium as claimed in claim 17, where said step (c) further comprises the steps of:

(c-5) inspecting the shared variables of said present statement to see whether any accessing incident is included if said input statement is neither the beginning nor the ending of a parallel loop; and (c-6) instrumenting the statement which inspects the inclusion of these accessing incidents to function on the iteration less than two times of the execution paths if the shared variables of the present statement include accessing incidents.

* * * * *